(12) United States Patent
Chiu

(10) Patent No.: US 8,972,709 B2
(45) Date of Patent: Mar. 3, 2015

(54) BOOTING METHOD FOR LOW TEMPERATURE ENVIRONMENT AND ELECTRONIC APPARATUS THEREFOR

(75) Inventor: Chia-Chang Chiu, Hsinchu (TW)

(73) Assignee: Getac Technology Corporation, Hsinchu County (TW)

( * ) Notice: Subject to any disclaimer, the term of this patent is extended or adjusted under 35 U.S.C. 154(b) by 299 days.

(21) Appl. No.: 13/609,174

(22) Filed: Sep. 10, 2012

(65) Prior Publication Data

US 2013/0151833 A1    Jun. 13, 2013

Related U.S. Application Data

(60) Provisional application No. 61/568,084, filed on Dec. 7, 2011.

(51) Int. Cl.
*G06F 15/177* (2006.01)
*G06F 1/26* (2006.01)
*G06F 9/44* (2006.01)

(52) U.S. Cl.
CPC ............... *G06F 9/4401* (2013.01); *G06F 1/26* (2013.01)
USPC ............................................................. 713/2

(58) Field of Classification Search
CPC .................................. G06F 1/26; G06F 9/4406
USPC ..................................................... 713/1, 2, 330
See application file for complete search history.

(56) References Cited

U.S. PATENT DOCUMENTS

| 7,281,150 | B1 * | 10/2007 | Strickland ..................... 713/330 |
| 2004/0059906 | A1 * | 3/2004 | Park et al. ......................... 713/2 |
| 2006/0282654 | A1 * | 12/2006 | Veen et al. ...................... 713/1 |
| 2009/0198387 | A1 * | 8/2009 | Lin et al. ....................... 700/300 |
| 2011/0296155 | A1 * | 12/2011 | Belady et al. .................... 713/2 |
| 2012/0072740 | A1 * | 3/2012 | Chen et al. ................... 713/300 |
| 2012/0282535 | A1 * | 11/2012 | Fabian et al. ................. 429/421 |

* cited by examiner

*Primary Examiner* — Kim Huynh
*Assistant Examiner* — Brandon Kinsey

(57) ABSTRACT

A booting method for low temperature environment and an electronic apparatus therefor are provided. The booting method includes the following steps: reading a booting process record from a memory unit of the electronic apparatus; executing a booting process according to the booting process record, wherein the booting process includes a plurality of booting subroutines; and when executing one of the booting subroutines, updating the booting process record stored in the memory unit of the electronic apparatus corresponding to the booting subroutine, wherein the booting subroutines include providing a power output by controlling a power supply unit of the electronic apparatus, and an output value of the power output gradually increases as executing the booting subroutines sequentially.

18 Claims, 4 Drawing Sheets reading a booting process record from a memory unit of the electronic apparatus — S101 executing a booting process according to the booting process record, wherein the booting process includes a plurality of subroutines that are to be executed sequentially — S102 updating the booting process record stored in the memory unit of the electronic apparatus corresponding to the booting subroutines when one of the booting subroutines is executed — S103

BOOTING METHOD FOR LOW TEMPERATURE ENVIRONMENT AND ELECTRONIC APPARATUS THEREFOR

BACKGROUND

1. Technical Field

The invention is related to a booting method and electronic apparatus therefor, and more particularly to a booting method for low temperature environment and electronic apparatus therefor.

2. Description of Related Art

In general, the electronic components have limitations of the lowest operating temperature. When electronic apparatus is disposed in a low temperature environment, the situation causes low performance of the electronic apparatus or the electronic apparatus to be unable to work normally even with adequate power supply. Many conventional methods are developed to improve above mentioned situation. For example, a hard drive heating unit is disposed on the hard drive of a notebook computer. When the notebook computer is unable to boot up after receiving a booting signal or the notebook computer crashes because of the low temperature, the notebook computer will heat up the hard drive through the hard drive heating unit before or during the boot process and also extend the power-on time of the motherboard to increase the temperature of some components on the motherboard. When the internal temperature of the notebook computer reaches an allowable working temperature, the notebook computer performs the boot process.

However, manufacturers may not install a temperature detection unit to measure the internal temperature of the notebook computer and hard drive temperature.

Instead, the hard drive is heated and the motherboard is powered for a fixed time when the notebook computer abnormally shutdowns or is unable to start. However, manufacturers using methods mentioned above do not take the external AC adapter of the notebook computer into consideration.

Under the low temperature environment, the AC adaptor experiences the same low performance or dropping of the power output issues. The aforementioned methods are used to increase the temperature of the notebook computer to an allowable booting temperature. However, the AC adapter may not work normally because it is still in a low temperature condition. Under such situation, the AC adapter is unable to bear the required outputs of the notebook computer during the boot process and that leads to the power failure of the AC adapter. The power failure of the AC adaptor causes abnormal shutdown of the notebook computer during the boot process. In other words, the reasons that cause the notebook computer to be unable to boot normally include the temperature limitation of the AC adaptor. But the conventional methods are only to heat the notebook computer. In this way, besides wasting energy, it also increases the unnecessary waiting time.

Notebook computers may meet the specifications for harsh environment, such as specifications for military use, other than general commercial specifications. However, the notebooks may still operate with the AC adaptors only for general commercial specification. Under certain emergency situation, it still takes the user a lot of unnecessary time to wait for the boot process of the notebook computer with specifications of harsh environment because the notebook computer works with the AC adaptor with general commercial specification. Also, it is not practical to dispose a heater on the AC adaptor. Therefore, how to stabilize the power supply of the AC adaptor with an effective time under low temperature environment so that the electronic apparatus, such as notebook computers, can boot up and operate normally is an issue that is necessary to be solved in the present field.

SUMMARY

The embodiments of the present invention provide a booting method for low temperature environment and electronic apparatus therefor, executing a booting process gradually, storing a booting process record, and continuing to boot according to the booting process record.

The embodiments of the present invention provide a booting method for low temperature environment adapted to an electronic apparatus, which includes the following steps. At first, reading the booting process record from the memory unit of the electronic apparatus. Follow by executing a booting process according to the booting process record, wherein the booting process includes a plurality of booting subroutines that are to be executed sequentially. Then, when executing one of the booting subroutines, updating the booting process record stored in the memory unit corresponding to the booting subroutines, wherein the booting subroutines include providing a power output by controlling a power supply unit of the electronic apparatus, an output value of the power output increases gradually with the sequential execution of the booting subroutines.

The embodiments of the present invention provide an electronic apparatus, including a memory unit, a controller, and a power supply unit. A booting process record is stored in the memory unit. The controller is coupled to the memory unit, the booting process record is read from memory unit, and a booting process is executed according to the booting process record. Wherein, the booting process includes a plurality of booting subroutines that are to be executed sequentially. The power supply unit is coupled to the controller. The power supply unit provides a power output, wherein an output value of the power output of the power supply unit controlled by the controller increases gradually as the sequential execution of the booting subroutines. Wherein, when the controller executes one of the booting subroutines, the controller updates the booting process record in the memory unit corresponding to the booting subroutines.

Base on the descriptions above, the embodiments of the present invention provide a booting method and electronic apparatus therefor, updates the booting process record corresponding to each of the booting subroutines. Hence, after the occurrences of power failure, the next re-booting process may start the execution from the last executed booting subroutines right before the power failure occurrence and the booting time is saved thereby.

Several exemplary embodiments accompanied with figures are described in detail below to further describe the disclosure in detail.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure

DETAILED DESCRIPTION OF DISCLOSED EMBODIMENTS

Figure 1:
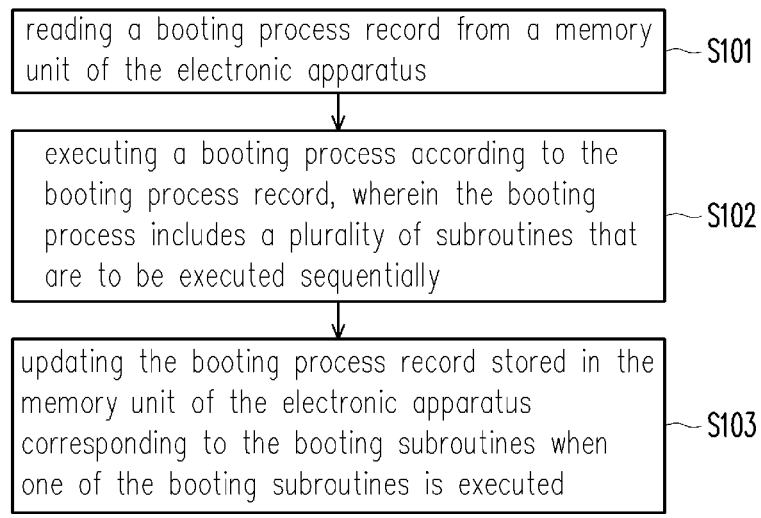
FIG. 1 is a flow chart of the steps of a booting method for low temperature environment according to an embodiment of the invention.

FIG. 1 is a flow chart of the steps of booting method for low temperature environment according to an embodiment of the invention. Referring to FIG. 1, at step S101, reading a booting process record from a memory unit of the electronic apparatus. In the step S102, executing a booting process according to the booting process record, wherein the booting process includes a plurality of subroutines that are to be executed sequentially. In the step S103, updating the booting process record stored in the memory unit of the electronic apparatus corresponding to the booting subroutines when one of the booting subroutines is executed. The booting subroutines include providing a power output by controlling a power supply unit of the electronic apparatus to the electronic apparatus), and an output value of the power output increases gradually as executing the booting subroutines sequentially.

It is noted that the power providing jobs sequentially provides a plurality of voltage levels of power outputs to the internal components of the electrical apparatus according to the working voltages of the internal components. For example, the power providing jobs provides power output with voltage level of 5V to the internal components with working voltage of 5V to enable the internal components. And then the power providing jobs provides the 3V power output to the internal components with working voltage of 3V, and so on. The internal components includes the essential components of the electrical apparatus, such as processors, control units, memory units, I/O units . . . etc, the invention is not limited to the aforementioned components.

Figure 2:
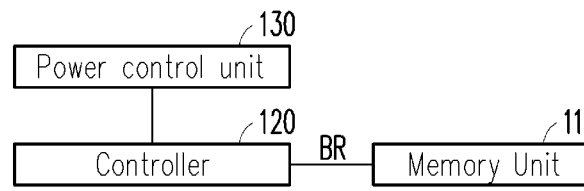
FIG. 2 is a block diagram of an electronic apparatus applied to a booting method for low temperature environment according to an embodiment of the invention.

FIG. 2 is a block diagram of the electronic apparatus applied to the booting method for low temperature environment according to an embodiment of the invention. Referring FIG. 2, the electronic apparatus 10 includes the memory unit 110, a controller 120, and the power supply unit 130. The memory unit 110 is configured to store the booting process record BR. The controller 120 is coupled to the memory unit 110. The controller 120 reads the booting process record BR from the memory unit 110, and executes a booting process according to the booting process record BR, wherein the booting process includes a plurality of booting subroutines that are to be executed sequentially. The power supply unit 130 is coupled to the controller 120 and provides a power output to supply the electronic apparatus, wherein an output value of the power output of the power supply unit 130 controlled by the controller 120 increases gradually as the sequential execution of the booting subroutines. When the controller 120 executes one of the booting subroutines, the controller updates the booting process record BR stored in the memory unit 110 corresponding to the booting subroutines.

It should be noticed that the booting process includes the booting subroutines which are executed before the booting of an operation system of the electronic apparatus. The booting subroutines include a plurality of pre-heating jobs, a plurality of power providing jobs, and a booting job for the internal components. Wherein, the pre-heating jobs include heating a hard drive of the electronic apparatus 10, and increasing the load of the heated hard drive gradually. The corresponding relationship between each steps of the booting process is described in detail below and accompanied with figures.

Figure 3:
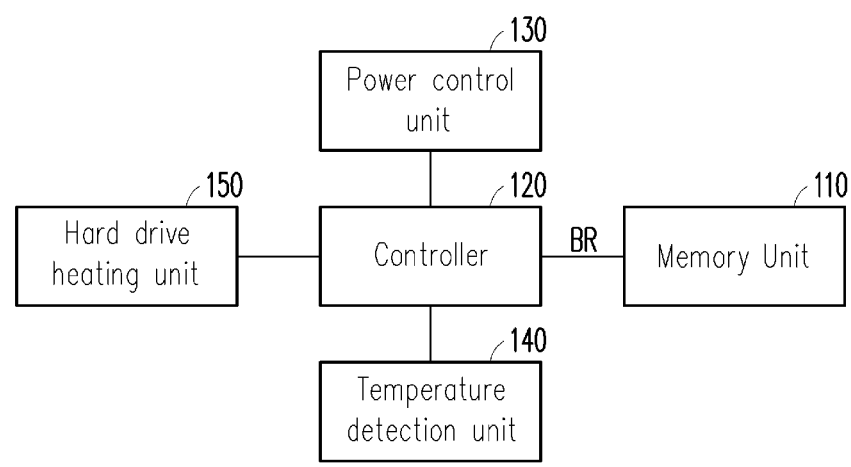
FIG. 3 is a block diagram of the electronic apparatus according to an embodiment of the invention.

FIG. 3 is a block diagram of the electronic apparatus according to an embodiment of the invention. Comparing an electronic apparatus 30 of FIG. 3 with the electronic apparatus 10 of FIG. 2, the electronic apparatus 30 illustrated by FIG. 3 further includes a hard drive heating unit 150 and a temperature detection unit 140 which are coupled to the controller 120. The hard drive heating unit 150 is controlled by the controller 120 and configured to heat a hard drive (not shown) of the electronic apparatus 30. The temperature detection unit 140 is configured to detect whether the current temperature of the electronic apparatus 30 is lower than a preset low temperature value.

Figure 4:
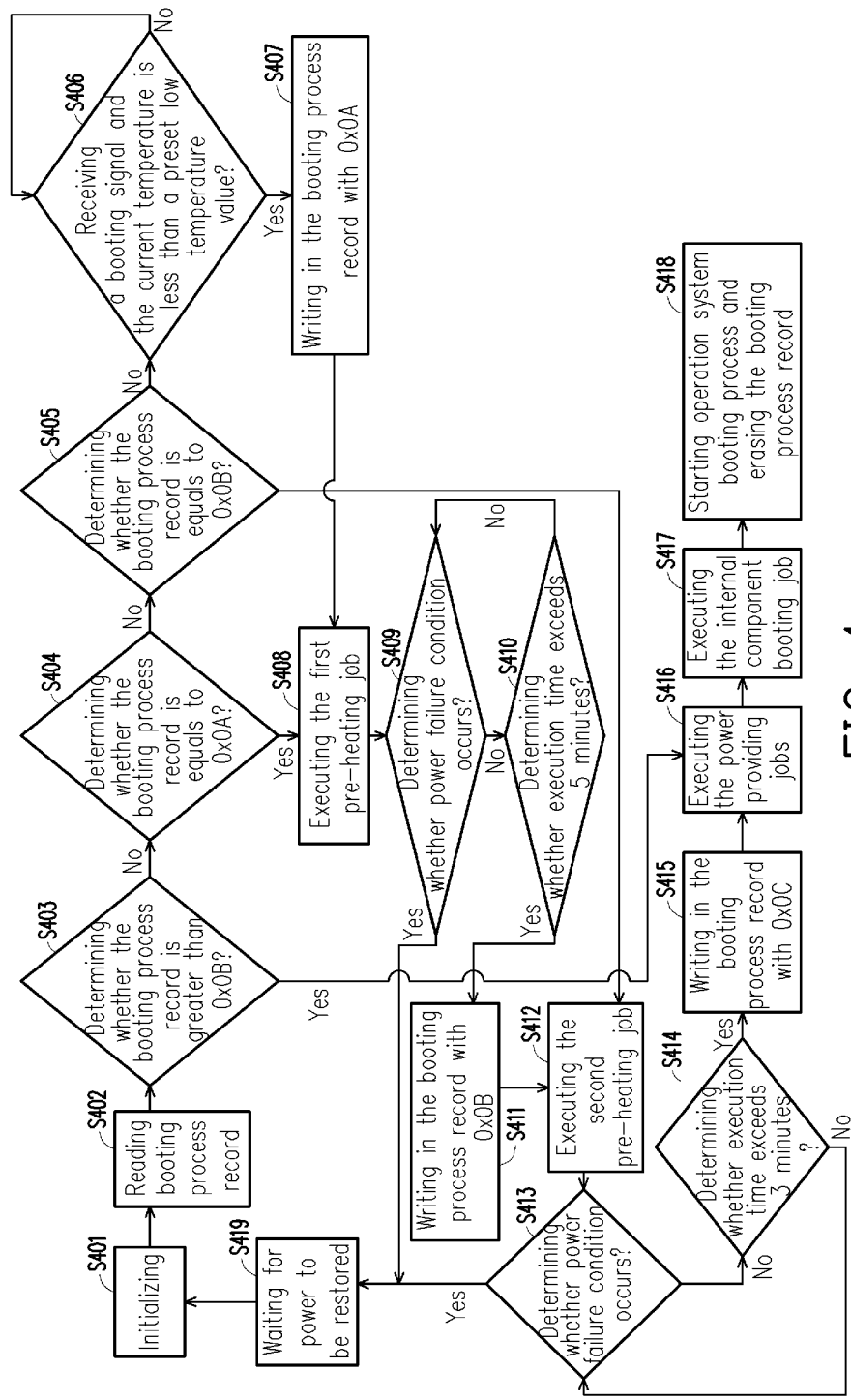
FIG. 4 is a flow chart of the steps of the booting method for low temperature environment according to an embodiment of the invention.

FIG. 4 is a flow chart of the steps of the booting method for low temperature environment according to an embodiment of the invention. The pre-heating jobs in the present embodiment include a first pre-heating job and a second pre-heating job. The first pre-heating job corresponds to heating the hard drive of the electronic apparatus 30 by using the hard drive heating unit 150 with 1 percent of duty cycle, which means activates the hard drive heating unit only 1 percent of a preset work cycle time. The second pre-heating job corresponds to heating the hard drive and the components in the electronic apparatus that requires to be heated by using the hard drive heating unit 150 with 10 percent of duty cycle. The amount of the pre-heating jobs and the load of each of the pre-heating jobs are configured according to the practical situation, and the process steps are also adjusted correspondingly. The embodiment of the invention is not limited to the utilization of two of the aforementioned pre-heating jobs.

Referring to FIG. 3 and FIG. 4, at first, the controller 120 initializes the booting process (step S401). The controller 120 then reads the booting process record BR from the memory unit 110 (step S402). Wherein, the memory unit 110 may be an Electrically-Erasable Programmable Read-Only Memory (EEPROM), a flash memory, or other non-volatile memory. Record contents of the booting process record BR correspond to each of the booting subroutines of the booting process sequentially and may be adjusted according to the configuration. For example, in the present embodiment, the value 0x0A of the booting process record BR corresponds to the first pre-heating job, and the value 0x0B of the booting process record BR corresponds to the second pre-heating job. Record contents set after the 0x0B corresponds to the booting subroutines executed after the pre-heating jobs, such as the power providing jobs. However the embodiment of the invention is not limited to the setup method described above.

Referring to FIG. 3 and FIG. 4, the controller 120 executes the corresponding actions according to the booting process record BR (steps S403~S405). Under the conditions that the booting process record BR does not have recordings, the controller 120 receives a booting signal, and a determination which indicates a current temperature is lower than the preset low temperature value is fed back to the controller 120 by the temperature detection unit 140, the controller 120 writes 0x0A corresponding to the first pre-heating job into the booting process record BR of the memory unit 110 (step S407). And then the controller 120 controls the hard drive heating unit 150 to execute the first pre-heating job (step S408).

Under the conditions that the hard drive pre-heating unit 150 controlled by the controller 120 which executes the first pre-heating job, the controller 120 continuously determines whether a power failure occurs on the present electronic apparatus 30 (step S409), and determines whether the working time of the execution of the first pre-heating job exceeds a preset time (step S410). If a power failure does not occur after the execution of the first pre-heating job exceeds the preset time (i.e. 5 minutes in the present embodiment), the controller 120 writes the 0x0B corresponding to the second pre-heating job into the booting process record BR of the memory unit 110 (step S411) and performs the second pre-heating job. The second pre-heating job includes the heating of the hard drive unit and other pre-heating jobs executed by the controller 120 simultaneously, and the power load required by the second pre-heating job is greater than the first pre-heating job (step S412).

Under the conditions that the execution of the second pre-heating job exceeds the preset time (i.e. 3 minutes in the present embodiment) without the power failure, and the present hard drive temperature detected by the temperature detection unit 140 is greater than a preset booting temperature (step S413~S414), the controller 120 writes 0x0C into the booting process record BR (step S415), executes the power providing jobs by controlling the power supply unit 130 (step S416), and then executes the booting job of the internal components (step S417). After the completion of step S416 and step S417, the temperatures of the electronic apparatus 30 and an AC adaptor reach the allowable temperature for an operation system booting process. Then the controller 120 starts the operation system booting process, wherein the operation system is stored in the hard drive. At the same time, the controller 120 erases the content of the booting process record BR stored in the memory unit 110 (step S418).

At the next booting of the electronic apparatus 30, the aforementioned booting process may be repeated.

All of the power sources of the electronic apparatus 30 are supplied from the AC adaptor (not shown) which is connected externally. When the AC adaptor is unable to bear the power load provided to the electronic apparatus 30, the power failure of the AC adaptor occurs. For example, the power failure occurs when the hard drive heating unit 150 controlled by the controller 120 executes the first pre-heating job (step S409) or the second heating job (step S413). The electronic apparatus 30 has no power source because of the power failure, and has to wait for the power of the AC adaptor to be restored (step S419). After the power is restored, the controller 120 may re-initialize the booting process (step S401) and reads the booting process record BR from the memory unit 110 (step S402).

For example, the power failure of the AC adaptor may occur when the hard drive heating unit 150 executes the second pre-heating job (S413), the controller 120 waits for the power to be restored(S419), and reinitializes the booting process (step
S401) after the power of the AC adaptor is restored (step S419). The controller 120 reads the booting process record BR from the memory unit 110 (step S402) to obtain the booting process record BR that is 0x0B. After the contents of the booting process record BR read by the controller 120 is determined(step S405), the hard drive heating unit 150 controlled by the controller 120 executes the second pre-heating job (step S412) and the following booting subroutines.

It should be noticed that the temperature detection unit 140 in the FIG. 3 may be implemented selectively. For example, in the practical exemplary condition, the temperature detection unit 140 may not be disposed due to cost consideration. Under such circumstances, the booting method for low temperature environment provided by the embodiments of the present invention may still be implemented normally. For example, the determinations related to the current temperature are removed from the determinations of the step S406 of the FIG. 4. The difference between implementing the temperature detection unit 140 and not implementing the temperature detection unit 140 is accuracy of determination. More accurate determinations may be obtained by implementing the temperature detection unit 140, and the possibility of the power failure decreases through the detection results of the temperature detection unit 140.

Figure 5:
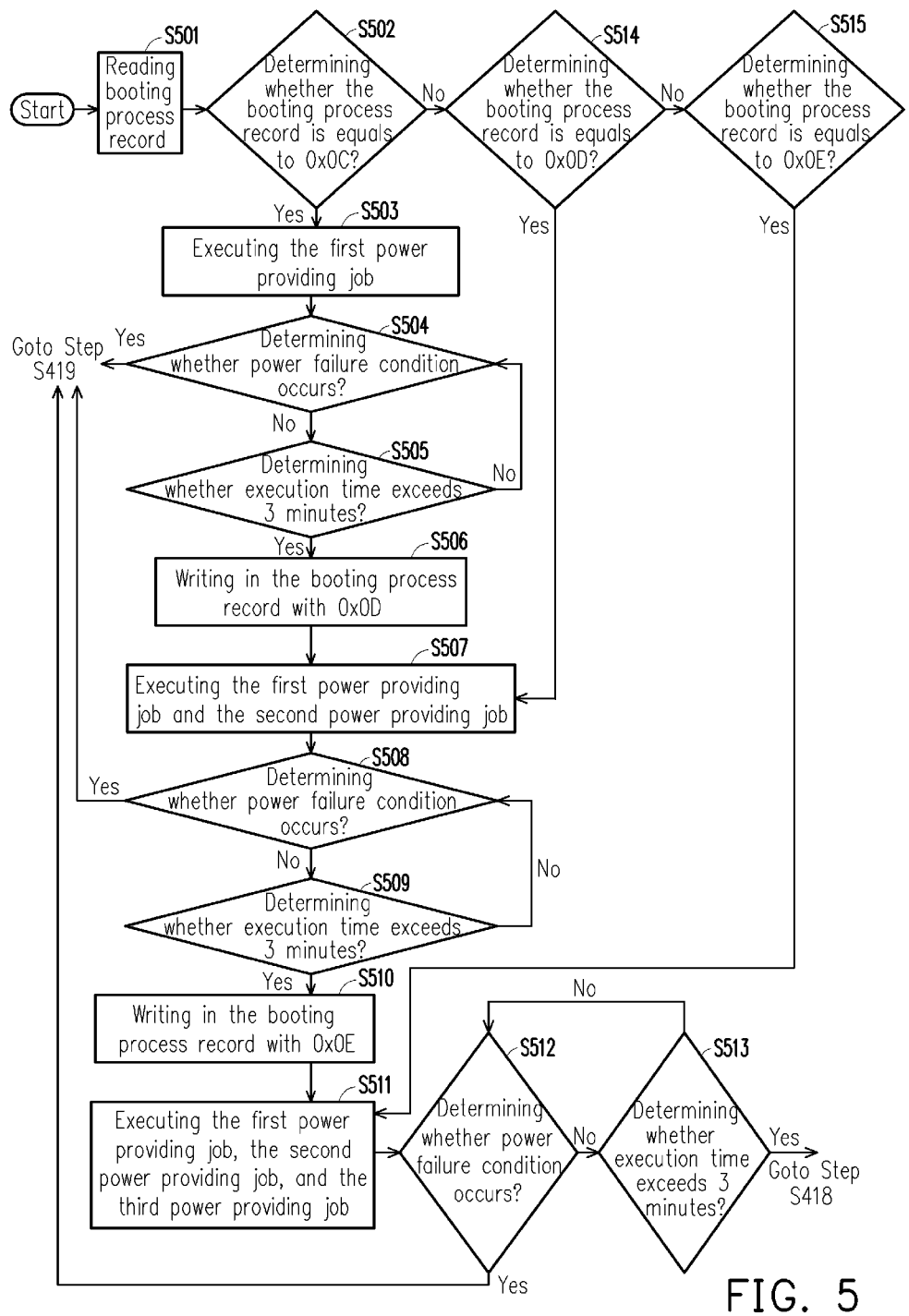
FIG. 5 is a flow chart of the steps of the power providing job of the booting method for low temperature environment according to an exemplary embodiment of the invention.

FIG. 5 is a flow chart of the steps for the power providing jobs of the booting method for low temperature environment according to an exemplary embodiment of the invention. FIG. 5 provides a detail description of an implementing method of the step S416 of the embodiment showing in FIG. 4. In the present embodiment, the power providing jobs include a first power supply job, a second power providing job, and a third power providing job, which respectively provides the voltages of 5 volt, 3 volt, and 1.5 volt to the corresponding components of the electronic apparatus 30 by the power supply unit 130, such as chipsets (not shown) or central processor (not shown).

Referring to FIG. 3 and FIG. 5, first, the controller 120 reads the booting process record BR from the memory unit 110 (step S501). When the booting process record BR equals to the 0x0C, which represents, for example, the controller 120 completed the aforementioned pre-heating jobs (step S502), the power supply unit 130 controlled by the controller 120 executes the first power providing job (step S503). When the time for the power supply unit 130 to execute the first power providing job exceeds a preset time (i.e. it is 3 minutes in the present embodiment) without occurrence of power failure (step S504 and step S505), the controller 120 writes 0x0D into the booting process record BR (step S506). The power supply unit 130 controlled by the controller 120 executes the first power providing job and the second power providing job (step S507) simultaneously, in other words, it provides the voltages of 5 volt and 3 volt to the corresponding components respectively and simultaneously.

For external AC adaptor, the load of the power supply unit 130 executing the first power providing job and the second power providing job simultaneously is only higher than the load of executing the first power providing job. In other words, the difference between the power providing jobs (step S416) and the pre-heating jobs of the aforementioned steps S403 to step S415 is increasing the number of the power providing jobs gradually to increase the load of the AC adaptor at the power providing jobs (step S416) The present embodiment of the invention gradually increases the number of the power providing jobs executed simultaneously to increase the load of the AC adaptor.

When the time of the power supply unit 130 to execute the first power providing job and the second power providing job simultaneously exceeds a preset time (i.e. 3 minutes) without occurrence of power failure (step S508, step S509), the controller 120 writes 0x0E into the booting process record BR (step S510). And then, the power supply unit 130 executes the first power providing job, the second power providing job, and the third power providing job simultaneously (step S511). When the time of the power supply unit 130 for executing the first power providing job, the second power providing job, and the third power providing job simultaneously exceeds a preset time (i.e. 3 minutes) without occurrence of power failure (step S512, step S513), the controller continues to execute the internal components booting jobs and the operating system booting process. (S417~S418 shown in FIG. 4).

When a power failure occurs, for example, the power failure of the AC adaptor occurs during the simultaneous execution of the first power providing job and the second power providing job (step S508), the controller 120 waits for the power to be restored. Then, the controller 120 reinitializes the booting process (step S401 in FIG. 4) after the power of the AC adaptor is restored (step S418 in FIG. 4). The controller 120 reads the booting process record BR from the memory unit 110 (step S402) and obtains the content of the booting process record BR is 0x0D (step S501). The value 0x0D has been written in the booting process record in step S506. After the content of the booting process record BR read by the controller 120 is determined (step S514), the controller 120 controls the power supply unit 130 and continues to execute the first power providing job and the second power providing job. The power failure that occurs at step S503 and step S512 is similar to the aforementioned condition, so the detail descriptions are omitted thereto.

In the exemplary embodiments of the FIG. 3, FIG. 4, and FIG. 5, it should be noticed that the recording contents of the corresponding booting subroutines are written to the booting process record BR in the memory unit 110 prior to the execution of each of the booting subroutines. However, the controller 120 in another exemplary embodiment executes each of the booting subroutines first, and then writes the recording contents of the corresponding booting subroutines to the booting process record BR. The process flow of the steps showing in the FIG. 4 and FIG. 5 may be adjusted to correspond to such configuration. The embodiment of the invention is not limited to the corresponding recording time of the booting process record BR.

Furthermore, in another exemplary embodiment, after the controller 120 reads the recording contents corresponding to the booting process record BR from the booting process records BR in the memory unit. The controller 120 starts the execution from the previous booting subroutine corresponding to the recording content of the booting subroutine to avoid the power failure problem of the AC adaptor effectively. For example, when the controller 120 reads a booting record 0x0B, the controller 120 controls the hard drive heating unit 150 to start the execution from the first pre-heating job. In other words, the recording contents of the booting process record BR is a reference basis for continuing executing the booting subroutines after the power of the AC adaptor is restored. The corresponding execution of the booting subroutine according to the recording contents of the booting process record BR may be configured according to the practical situation. For example, the controller 120 starts the execution from the previous booting subroutine corresponding to the booting subroutines at which the power failure happens or the second previous subroutine of the booting subroutines. The embodiment of the invention is not limited thereto.

In another exemplary embodiment, the booting process record BR records only a single content such as the 0x0A of the aforementioned embodiment or a Boolean value. The corresponding booting subroutine includes a pre-heating job and a power providing job. After executing time of the pre-heating job exceeds a preset time, the controller 120 writes 0x0A into the booting process record BR in the memory unit (or the Boolean value "True"). As a result, a power failure occurs when the execution of the subroutines is at the power providing job. After the controller 120 restarts booting process, the pre-heating job may be skipped and starts the execution from the power providing job directly. Wherein, the booting subroutines and the execution contents corresponding to the booting subroutines are not limited to the aforementioned configuration. The present embodiment may be viewed as a simplified version of the aforementioned embodiments, and yet without departing from the spirit of the embodiments of the invention, and the described desired goals of the embodiments of the invention is reached with a simpler approach.

In summary, the embodiments of the invention provide a booting method for low temperature environment and electronic apparatus therefor to gradually increase the load of the external AC adaptor of the electronic apparatus. The hard drive of the electronic apparatus, other internal components and the AC adaptor may be heated to gradually reach the working temperature under a low temperature environment. The occurrences of the power failure due to the high load of the AC adaptor under the low temperature environment are decreased. Furthermore, the booting method for low temperature environment and electronic apparatus therefor further corresponds to each of the booting subroutines that are recorded in the booting process record. When the power failure condition occurs, the electronic apparatus may execute the sequential booting subroutine according to the booting process record after the restoration of power. Other than saving the waiting time before reboot, it further saves unnecessary energy waste under the low temperature environment.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A booting method for low temperature environment, adapted to an electronic apparatus, comprising:
    providing a plurality of booting subroutines that are to be executed in a predetermined sequence, wherein the booting subroutines includes providing a power output by controlling a power supply unit of the electronic apparatus, an output value of the power output gradually increasing as the booting subroutines are executed sequentially;
    reading a booting process record from a memory unit of the electronic apparatus;
    initiating execution of the booting process, beginning with one of the plurality of booting subroutines according to the booting process record, and then sequentially performing each subsequent booting routine in the predetermined sequence;
    sequentially updating the booting process record stored in the memory unit of the electronic apparatus as each of the booting subroutines is executed;
    detecting a power failure condition of the power supply unit;
    after the power failure condition is detected, waiting for the power output of the power supply unit to be restored; and
    reading the updated booting process record from the memory unit of the electronic apparatus, and re-initiating execution of the booting process beginning with one of the plurality of booting subroutines according to the updated booting process record.

2. The method as claimed in claim 1, wherein when executing one of the booting subroutines, the aforementioned steps further comprises:
    executing at least one booting job corresponding to the output value of the power output, wherein the at least one booting job includes a plurality of pre-heating jobs, a plurality of power providing jobs, and an internal component booting job.

3. The method as claimed in claim 2, wherein:
    the booting jobs include sequentially executing from a first power providing job to a Kth power providing job, when executing to a Mth power providing job, simultaneously executing from the first the power providing job to the Mth the power providing job, wherein the K value is a natural number, the M value is between 1 and K.

4. The method as claimed in claim 1, wherein:
executing the booting process from the beginning when the booting process record is not able to be read from the memory unit of the electronic apparatus.

5. The method as claimed in claim 1, wherein before the step of reading the booting process record, the method further comprises:
receiving a booting signal; and
detecting if a current temperature of the electronic apparatus is lower than a preset low temperature value.

6. The method as claimed in claim 1, wherein after the step of executing a booting process is completed, the method further comprises:
booting an operation system of the electronic apparatus and erasing the booting process record in the memory unit.

7. The method as claimed in claim 1, wherein the step of updating the booting process record further comprises:
storing a record in the booting process record in the memory unit corresponding to a next booting subroutine to be performed in the predetermined sequence before beginning execution thereof.

8. The method as claimed in claim 1, wherein the step of updating the booting process record further comprises:
storing a in the booting process record in the memory unit corresponding to a completed booting subroutine after execution thereof is finished.

9. An electronic apparatus, adapted to a booting method for low temperature environment, comprising:
a memory unit, storing a booting process record and a plurality of booting subroutines that are to be executed in a predetermined sequence, wherein the booting subroutines includes providing a power output by controlling a power supply unit of the electronic apparatus, an output value of the power output gradually increasing as the booting subroutines are executed sequentially;
a controller, coupled to the memory unit, reading the booting process record from the memory unit; and
a power supply unit, coupled to the controller, providing a power output, wherein an output value of the power output of the power supply unit is controlled by the controller;
wherein the controller is programmed to:
initiate execution of the booting process, beginning with one of the plurality of booting subroutines according to the booting process record, and then sequentially performing each subsequent booting routine in the predetermined sequence;
sequentially update the booting process record stored in the memory unit of the electronic apparatus as each of the booting subroutines is executed; detecting a power failure condition of the power supply unit;
after the power failure condition is detected, wait for the power output of the power supply unit to be restored; and
read the updated booting process record from the memory unit of the electronic apparatus, and re-initiate execution of the booting process beginning with one of the plurality of booting subroutines according to the updated booting process record,
wherein an output value of the power output of the power supply unit controlled by the controller increases gradually with the execution of the booting subroutines by the electronic apparatus.

10. The electronic apparatus as claimed in claim 9, wherein:
when controller executes one of the booting subroutines, the controller further executes at least one booting job corresponding to the output value of the power output of the booting subroutines, wherein the at least one booting job includes a plurality of pre-heating jobs, a plurality of power providing jobs, and an internal apparatus booting job.

11. The electronic apparatus as claimed in claim 10, wherein:
the booting job includes executing from a first power providing job to a Kth power providing job, when controller executes a Mth power providing job, the controller simultaneously executes the first power providing job to the Mth power providing job to the Mth, wherein the K value is a natural number, the M value is between 1 and K.

12. The electronic apparatus as claimed in claim 10, wherein:
when the booting process record is not able to be read by the controller from the memory unit of the electronic apparatus, the controller executes the booting process from the beginning.

13. The electronic apparatus as claimed in claim 9, wherein the electronic apparatus further comprises a temperature detection unit, connected to the controller,
wherein, before the booting process record is read by the controller, the controller further receives a booting signal, and the controller determines whether a current temperature of the electronic apparatus currently detected by the temperature detection unit is lower than a preset low temperature value.

14. The electronic apparatus as claimed in claim 9, wherein:
after the controller finishes the booting process, the controller boots an operation system of the electronic apparatus, and erases the booting process record in the memory unit.

15. The electronic apparatus as claimed in claim 9, wherein:
the controller stores a record in the booting process record in the memory unit corresponding to a next booting subroutine to be performed in the predetermined sequence before beginning execution thereof.

16. The electronic apparatus as claimed in claim 9, wherein:
the controller stored a record in the booting process record in the memory unit corresponding to a completed booting subroutine after execution thereof is finished.

17. The method as claimed in claim 1, wherein in the step of re-initiating execution of the booting process, the one of the plurality of booting subroutines executed is before the booting subroutine indicated by the updated booting process record in the predetermined sequence of booting subroutines.

18. The electronic apparatus as claimed in claim 9, wherein when re-initiating execution of the booting process, the one of the plurality of booting subroutines executed is before the booting subroutine indicated by the updated booting process record in the predetermined sequence of booting subroutines.

* * * * *